(12) United States Patent
Pasturel et al.

(10) Patent No.: US 6,944,541 B2
(45) Date of Patent: Sep. 13, 2005

(54) SYSTEMS AND METHODS FOR FAULT DETECTION AND EXCLUSION IN NAVIGATIONAL SYSTEMS

(75) Inventors: Patrice Knut Pasturel, Scio, OR (US); Robert C. Rose, Gold Canyon, AZ (US)

(73) Assignee: Garmin AT, Inc., Salem, OR (US)

( * ) Notice: Subject to any disclaimer, the term of this patent is extended or adjusted under 35 U.S.C. 154(b) by 0 days.

(21) Appl. No.: 10/985,858

(22) Filed: Nov. 10, 2004

(65) Prior Publication Data

US 2005/0096844 A1 May 5, 2005

Related U.S. Application Data

(63) Continuation of application No. 10/426,008, filed on Apr. 29, 2003, now Pat. No. 6,856,905.

(51) Int. Cl.[7] ............................................. G01C 21/00
(52) U.S. Cl. .................. 701/214; 701/213; 342/357.12; 342/358
(58) Field of Search ................................ 701/213, 214; 342/357.06, 357.12, 358

(56) References Cited

U.S. PATENT DOCUMENTS

| 5,420,594 A | | 5/1995 | FitzGerald et al. | |
|---|---|---|---|---|
| 5,436,632 A | * | 7/1995 | Sheynblat | ............... 342/357.03 |
| 5,600,329 A | | 2/1997 | Brenner | |
| 5,663,732 A | | 9/1997 | Stangeland et al. | |
| 5,702,070 A | | 12/1997 | Waid | |
| 5,760,737 A | | 6/1998 | Brenner | |
| 5,808,581 A | | 9/1998 | Braisted et al. | |
| 5,841,399 A | | 11/1998 | Yu | |
| 5,969,670 A | | 10/1999 | Kalafus et al. | |
| 5,969,672 A | | 10/1999 | Brenner | |
| 6,114,988 A | | 9/2000 | Schipper et al. | |
| 6,134,484 A | | 10/2000 | Geier et al. | |
| 6,166,683 A | | 12/2000 | Hwang | |
| 6,204,806 B1 | | 3/2001 | Hoech | |
| 6,205,377 B1 | | 3/2001 | Lupash et al. | |
| 6,311,127 B1 | * | 10/2001 | Stratton et al. | ............. 701/213 |
| 6,345,232 B1 | | 2/2002 | Lynch et al. | |
| 6,486,831 B1 | * | 11/2002 | Martorana et al. | .......... 342/458 |
| 6,856,905 B2 | * | 2/2005 | Pasturel et al. | ............. 701/214 |

OTHER PUBLICATIONS

Ormand, D.; *Wide Area Augmentation System (WAAS)*; 31st Annual Precise Time and Time Interval (PTTI) meeting; Dec. 7–9, 1999, pps. 155–160.

Walter, T. et al., *Flight Trials of the Wide–Area Augmentation System (WAAS)*; Stanford University, Sep. 23, 1994.

* cited by examiner

*Primary Examiner*—Gary Chin
(74) *Attorney, Agent, or Firm*—Devon A. Rolf

(57) ABSTRACT

The Fault Detection and Exclusion (FDE) system for use in navigational systems that rely upon multiple ranging signals, such as GPS satellites, uses an FDE algorithm to detect, as soon as possible, whether a fault exists in a signal associated with one or more of the GPS satellites. The system makes this determination by comparing a computed residual error with a first fault detection threshold. After determining that the computed residual error has exceeded the first, relatively low, fault detection threshold, the system transmits a signal to one or more external systems indicating that one or more signals associated with the various GPS satellites may be faulty. The system then monitors horizontal estimated position error (HUL) until this value has met or exceeded a relatively high fault isolation threshold value. The system then attempts to isolate and exclude the faulty satellite from the current navigational solution.

16 Claims, 6 Drawing Sheets

SYSTEMS AND METHODS FOR FAULT DETECTION AND EXCLUSION IN NAVIGATIONAL SYSTEMS

The present application is a continuation application of U.S. patent application Ser. No. 10/426,008, filed Apr. 29 2003 now U.S. Pat. No. 6,856,905.

BACKGROUND OF THE INVENTION

1. Field of the Invention

The present invention relates generally to navigational systems, and more particularly, to a fault detection and exclusion (FDE) system for use in a navigational system utilizing multiple ranging signals to determine a position of an object.

2. Description of Related Art

Global Navigation Satellite Systems (GNSS), such as the Global Positioning System (GPS), are typically used for navigational purposes for a variety of mobile vehicles in which relatively accurate position data is required. For instance, the GPS system is used in aircraft for guidance and navigation, in land vehicles for navigation, and in marine vehicles for navigation. A typical GPS system includes: (1) a nominal 24 satellite constellation that is positioned in six earth-centered orbital planes; (2) a ground control/monitoring network; and (3) various GPS receivers. The GPS satellites are known to use direct sequence, spread spectrum modulation for transmission of ranging signals and other navigational data. The ranging signals broadcast by the satellites are modulated with pseudo-random noise (PRN) codes that are replicated by the GPS receivers. The broadcast ranging signals generated by the GPS satellites are subject to significant errors due to anomalies in the satellite clocks, broadcast data, and atmospheric contributions, such as ionospheric and tropospheric effects. Other types of systems that provide ranging signals for navigation purposes also have similar issues.

These errors, as well as other errors in signals transmitted from GPS satellites and other ranging devices, can cause significant problems in navigation systems, such as aircraft navigation systems, which use GPS receivers and GPS satellite signals to calculate a navigation solution. For instance, an aircraft's navigation solution represents the calculated position of the aircraft in three-dimensional space at a particular time, plus heading and speed information. Navigation solution integrity, which is the guarantee to some specified high confidence level that some scalar measure of navigation solution position error (e.g., horizontal, vertical) is below a threshold called the Horizontal Alarm Limit (HAL), is essential. The function or device that ensures navigation solution integrity performs a computation of the current estimated position error and also continuously monitors a variable that is indicative of navigation solution integrity also known as the Horizontal Protection Level (HPL).

Due to potential inaccuracies in the navigational data caused by various GPS anomalies and/or other ranging sources, aircraft are typically provided with a backup navigational system that is used when the navigational data provided by the primary system, (e.g., GPS system), is not sufficiently accurate for navigational purposes. For example, many GPS receivers are provided with a self-contained Receiver Autonomous Integrity Monitoring (RAIM) system for the detection of satellite anomalies that would cause the error in the computed position to grow and possibly exceed a predetermined threshold considered safe for the current phase of flight. RAIM is one method of monitoring the integrity of a GPS navigation solution for position and time. The objective of RAIM is detection of a fault/failure condition to protect the navigation solution against the effect of an unbounded, pathological bias in any one measurement (i.e., from a GPS satellite signal) that is used as an input to the navigation solution. RAIM accomplishes this by monitoring the consistency of redundant position measurements data in an over-determined navigation position solution.

RAIM is typically implemented in software in the GPS receiver and employs an instantaneous self-consistency check. In order for RAIM to function as intended, a minimum plurality of satellite or other ranging signals are required. Where such a minimum plurality of ranging signals is not available, the RAIM internal consistency check is not available; therefore, horizontal position integrity information is not available. In addition, RAIM may also generate error values based upon the consistency check, which are then compared to predetermined error limits. Accordingly, should an error value exceed the corresponding allowable, error limit, a RAIM alarm may be generated to indicate the failure of the consistency check. This alarm is a warning to the user that although horizontal position data may be available, it may be erroneous. In such instances, where RAIM is not available or a RAIM alarm is generated, the integrity of the navigation solution is questionable.

When the RAIM function, also known as the Fault Detection (FD) function, is available, RAIM then can offer two levels of integrity capability, which differ in terms of action each undertakes following the determination that the RAIM function is available. As is well known to those in the art, the RAIM function is determined to be available if the computed protection level is less than the alarm limit against which protection is sought. The first of these two RAIM function capabilities, assuming the RAIM function is available, indicates there are no faulty measurements and therefore the position error is expected to be rather small, or alerts the user that a faulty measurement has been detected (to a specified probability) and the reported GPS position solution accuracy may not be within a pre-specified tolerance. If the RAIM function detects a faulty measurement, the RAIM function is unable to determine which of the measurement(s) (one or more) is faulty. The second of these RAIM function integrity capabilities, called Fault Detection and Exclusion (FDE), attempts to continue GPS navigation with integrity following fault detection. FDE attempts to identify the faulty measurement and exclude it from use in the navigation solution. If the faulty measurement cannot be identified, RAIM simply provides the FD level of integrity, i.e., issues an alert/alarm to the user.

Prior art FDE systems typically identify and exclude satellites by: (1) determining whether fault detection is available; (2) if fault detection is available, determining whether a fault has occurred—this is done by determining whether a "residual error" (typically calculated using the statistically-based least squares residual (LSR) method) is greater than a predetermined threshold value; (3) if the residual error is greater than a predetermined threshold value, identifying a failed satellite that is contributing to the residual error; (4) once the failed satellite is identified, excluding this satellite's measurement from the position computation; and (5) if the failed satellite can not be identified within a given amount of time, alerting the user that the reported estimated position error is greater than the allowable position error for an allowed amount of time or that the GPS navigational system is no longer operating within the required integrity. It is also possible to exclude enough satellite(s) to render the detection function unavailable.

Prior art systems are known to delay the FD function until the position error has grown to be close to, yet below, the allowable position error for the given operation. This is done to improve the probability of correctly detecting a fault because the faulty satellite's influence on the position has grown as the position error has increased. Attempts to isolate the faulty signal too early can result in an incorrect identification, because the errors have not become significantly large enough to accurately detect which signals are in error. Thus, although there is a need to detect a fault as soon as possible in the interest of operational safety, attempting isolation of the faulty signals prematurely leads to incorrect determinations of faulty signals.

BRIEF SUMMARY OF THE INVENTION

The present invention relates to a Fault Detection and Exclusion (FDE) system for use in navigational systems that rely upon multiple ranging signals, such as GPS satellites for example, to determine the position of an object. The system first determines whether or not the Fault Detection function (RAIM) is available. This is done by computing a integrity value, such as horizontal protection level (HPL), which defines an area in which there is an assurance that the detection of a ranging signal fault will be determined with given missed alert and false alert probabilities, and comparing the integrity value to a horizontal alarm limit (HAL), which defines the outer limit value before an alarm must be provided concerning navigation integrity. If the integrity value, e.g., HPL, is less than the alarm limit (HAL), then the FD function (RAIM) is available. Conversely, if the integrity value is greater than the alarm limit, the FD function is not available.

When the FD function is available, the system then uses an FDE algorithm to detect whether a fault exists in a ranging signal, e.g., one or more of the GPS satellites. The system makes this determination by comparing a computed test value or statistic with a fault detection threshold. The test value or statistic is typically the root sum square of the residuals from the ranging signals, (e.g., GPS signals). The fault detection threshold, which is sometimes referred to herein as the "first" threshold, is partly a function of the number of ranging sources, and is derived based on requirements for the probability of a missed detection and false detection. The first fault detection threshold typically remains constant regardless of the vehicle's current operating conditions, such as an aircraft's current flight conditions. However, in some embodiments, the fault detect threshold, (i.e., first threshold), may be selected based on the operating conditions of the aircraft, such as for example, in the precision approach flight mode. In this mode, the missed detection and/or false detection probabilities are substantially different from other modes so as to require use of a different value for the fault detection threshold.

When it is determined that the computed test value or statistic has exceeded the fault detection threshold, the system transmits a signal to one or more external systems indicating that one or more signals associated with the various GPS satellites, and/or other ranging sources, may be faulty. The system also generates an estimate, in a statistical confidence sense, of the actual horizontal position error (Horizontal Uncertainty Level, HUL). The HUL is an accuracy measurement of the position of the aircraft. During the time that the first threshold, (fault detection threshold), is exceeded, the system monitors the HUL value until this value meets or exceeds a fault isolation threshold value, which preferably is a factor of HAL and like HAL will vary depending upon the vehicle's current operating conditions, such as an aircraft's current flight conditions. This fault isolation threshold is sometimes referred to herein as the "second" threshold. The second threshold can be set to any value. In some preferred embodiments of the invention, the second threshold value is a relatively high percentage of HAL, such as 70% or more of a HAL. In other words, if HAL defines the outer limit where an error must be reported, the fault isolation threshold is set as a lower limit of HAL so as to alert the system that the faulty ranging signal(s) should be detected and isolated before the position accuracy measurement HUL exceeds HAL. This in effect, creates a window of time for the system to detect and isolate faulty signals before the system is required to generate an alarm when $HUL \geq HAL$.

As stated, once the HUL value has met or exceeded the second threshold value, the system attempts to isolate (i.e., identify) the faulty ranging signal using standard isolation techniques. Once the system isolates the faulty ranging signal, the system excludes that ranging source from the current navigational solution.

If during the detection and isolation phase, the HUL value meets or exceeds HAL for more than a given time-to-alarm/alert (TTA), the system generates an alarm, indicating that HUL met or exceeded HAL before the system was able to detect and isolate the faulty ranging signal(s). In some embodiments, the system also keeps a record of the time elapsed from when HUL exceeded the second threshold. This time indicates how long the fault detection and isolation process has been running. If this elapsed time exceeds a maximum selected time, the system may issue an alert that it was unable to detect which ranging signal(s) was faulty.

The system and method of the present invention have several advantages. First, because the first threshold value, (fault detection threshold), is set relatively low, the system detects the presence of faulty ranging signals at an early stage. This allows the system to provide an early warning to other systems that one or more satellites or other ranging sources may not be functioning properly. Second, configuring the system to wait until the HUL value has reached a second threshold (preferably corresponding to a relatively high percentage of HAL) before attempting to determine which ranging signal(s), (e.g., GPS signals), is in error increases the likelihood of quickly and successfully identifying the faulty ranging signal and minimizes the likelihood of erroneously excluding a valid ranging measurement.

Furthermore, the second threshold, (i.e., fault isolation threshold), of the present invention preferably varies with variable alarm limits, (i.e., a factor of HAL). The calculation of a variable position error (second) threshold that triggers the detection and isolation function is much easier and less computationally intensive than calculating a variable residual error (first) threshold. In particular, a variable position error threshold is computed by multiplying the HAL by a percentage, while a variable residual error threshold must be determined by running thousands, and in some cases millions, of offline simulations. These simulations typically cannot be run on the target system because they are computationally intensive and time consuming and cannot be run in real-time systems such as GPS receivers. In addition, because the thresholds must be determined for each degree of freedom of the system, which is the number of ranging signals in the system minus four, computing multiple variable position error thresholds is significantly less time consuming than computing multiple variable residual error thresholds.

Furthermore, the fault detection in the FDE systems and methods of the present invention are independent of the operational mode because fault detection is based upon ranging measurements, missed alert requirements, and false alert requirements, not operational requirements. Thus, a complete set of second thresholds for each HAL (one for each operational mode) is not needed in the present invention and provides increased flexibility for changes in the system. Examples of aircraft operational flight modes are: oceanic, en route, terminal, non-precision approach, and precision approach.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below in conjunction with a Global Positioning System (GPS). It is understood, however, that the present invention can be applied to any ranging technology, where the invention is supplied with ranging data from multiple sources for determining navigational information. The invention is described below in a GPS system merely to aid in the understanding of the invention to other types of ranging sources and systems. For example, the system could be used with laser and radar ranging systems, LORAN systems, barometric altimeters, and distance measurement equipment, to name a few.

Figure 1:
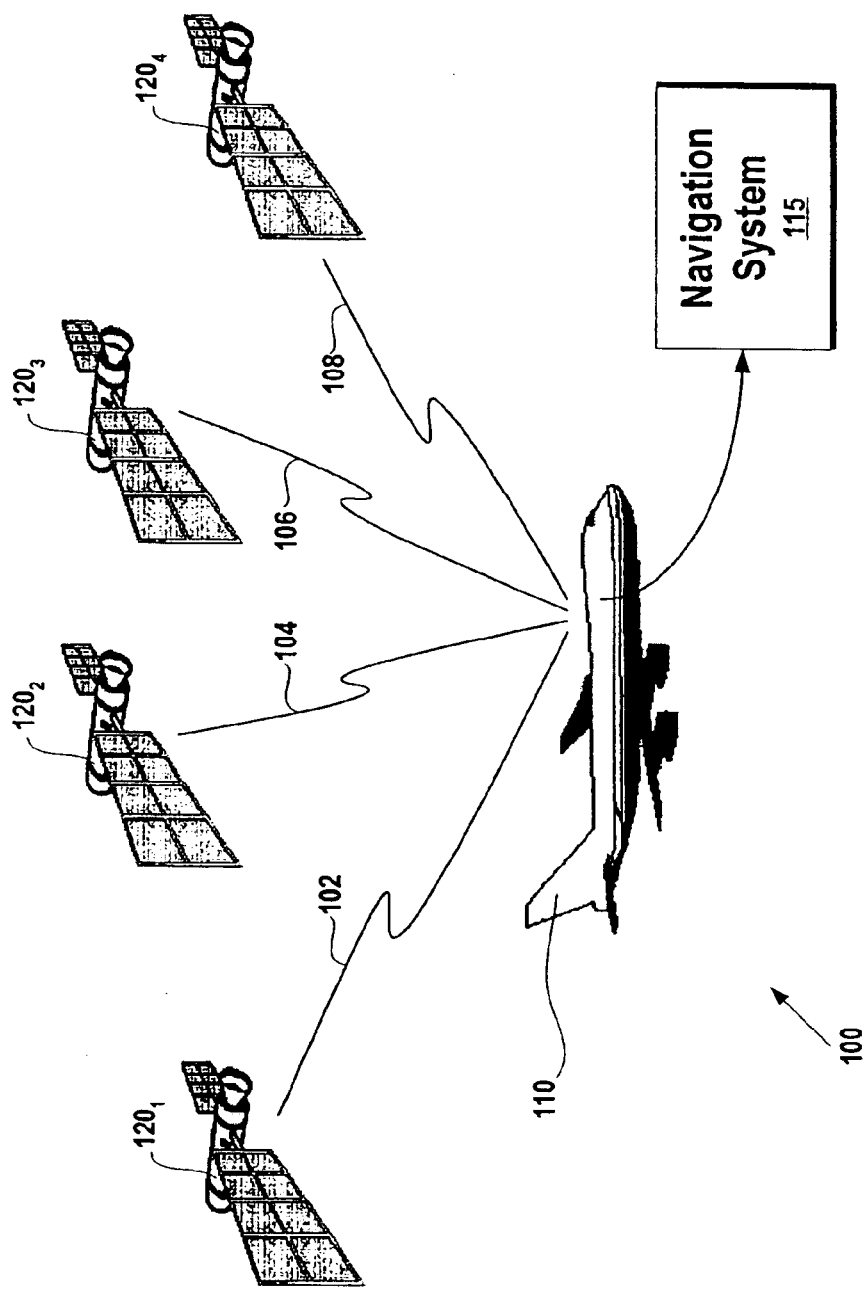
FIG. 1 is a diagram illustrating a system in which one embodiment of the present invention can be practiced.

FIG. 1 is a diagram illustrating a system 100 in which the present invention may be practiced, including a navigation system 115 implementing fault detection and exclusion in accordance with the present invention. In preferred embodiments, the navigation system 115 is intended for use on an aircraft 110, but is not limited to such a use. For instance, the navigation system described herein may be implemented in ships, automobiles, military vehicles, or the like. The navigation system 115 includes at least one GPS receiver, and GPS based navigation systems and circuitry adapted to receive GPS satellite signals from multiple GPS satellites, such as GPS satellite signals 102, 104, 106 and 108 from GPS satellites $120_1$, $120_2$, $120_3$ and $120_4$ illustrated in FIG. 1. The navigation system 115 determines a navigation solution based upon the information contained in and measurements derived from the received GPS satellite signals 102, 104, 106, 108. The navigation system 115 is also adapted to provide fault detection and exclusion (FDE) using methodology described herein. According to one aspect of the present invention, the FDE is implemented by the GPS receiver within the navigation system 115.

Figure 2:
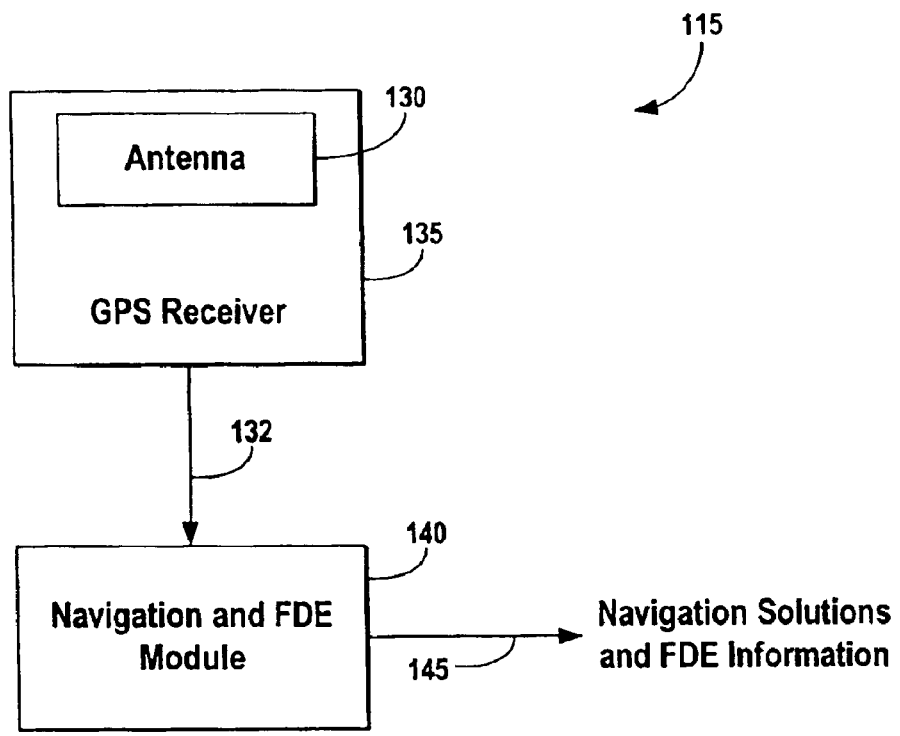
FIG. 2 is a block diagram illustrating a navigation system according to one embodiment of the present invention.

According to one embodiment of the invention illustrated in FIG. 2, the navigation system 115 includes a GPS receiver 135, antenna 130 and navigation and FDE module 140. The antenna 130 is adapted to receive the GPS satellite signals 102, 104, 106, 108 and to provide an output 132 to navigation and FDE module 140, which is indicative of the satellite signals and the information contained therein. Although the antenna 130 is illustrated in FIG. 2 as being located within the GPS receiver 135, and the navigation and FDE module 140 is illustrated as being external to the GPS receiver 135, it should be appreciated that one or more of the elements in FIG. 2 may be separate or combined. For instance, the antenna 130 may be exterior to the GPS receiver 135, and/or the navigation and FDE module 140 may be internal to the GPS receiver 135. Additionally, as will be appreciated by those of skill in the art, one or more additional elements may be included within or in communication with the navigation system, such as a navigator or transponder for communicating with ground based systems.

Figure 5A:
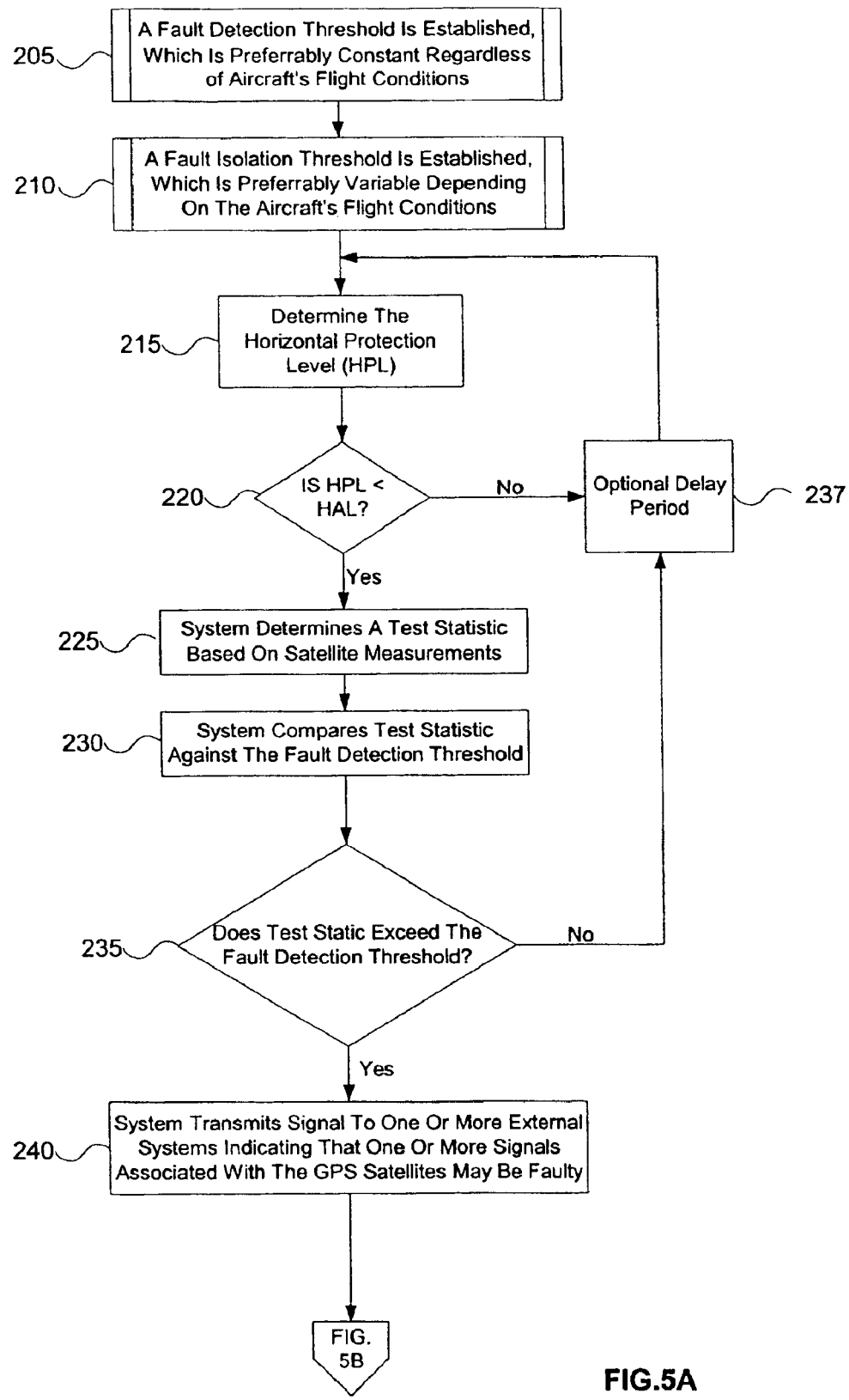
FIG. 5A is a flow chart illustrating a first portion of the fault detection and exclusion function implemented by the navigation system of the present invention, according to one embodiment of the present invention.
Figure 5B:
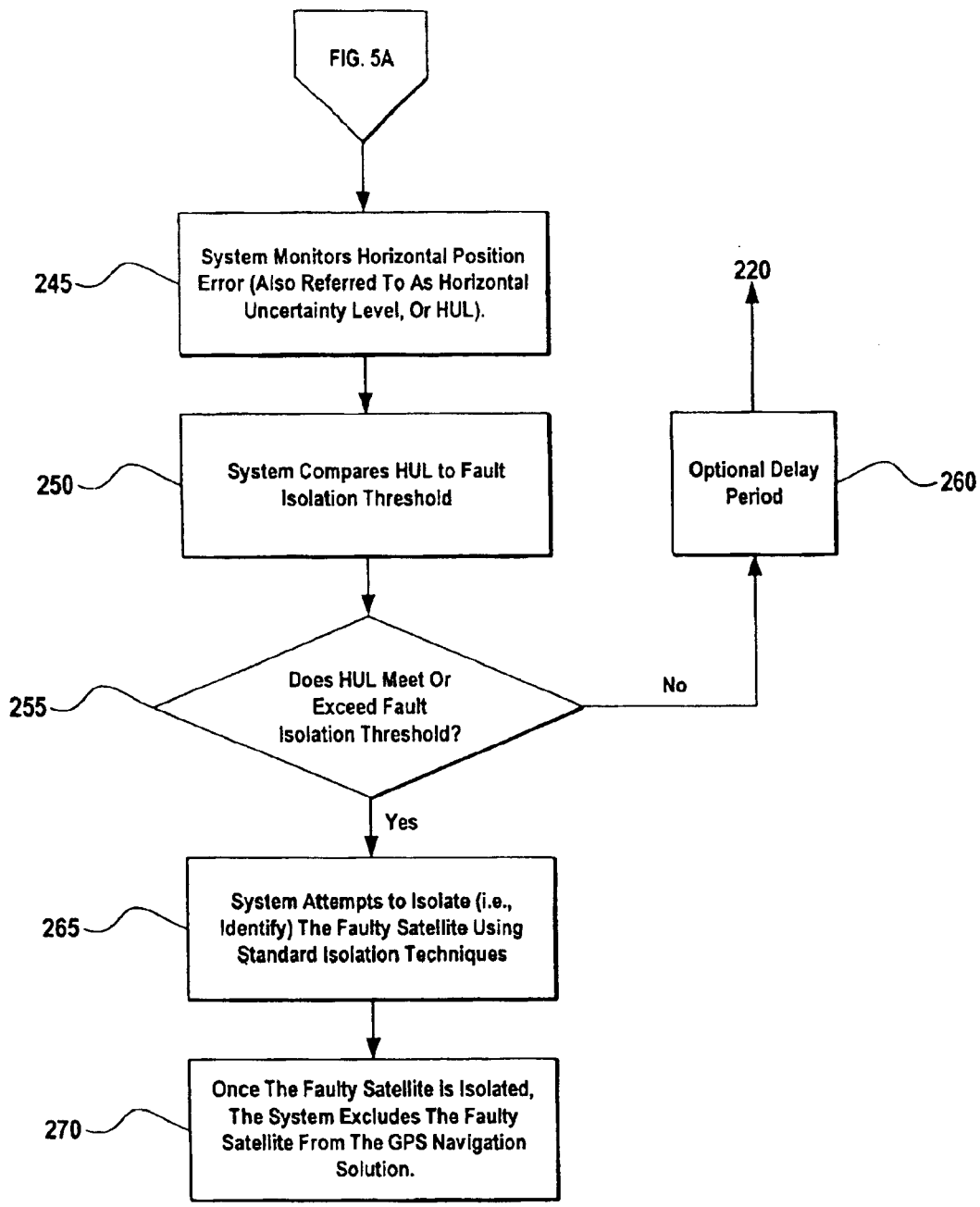
FIG. 5B is a flow chart illustrating a second portion of the fault detection and exclusion function implemented by the navigation system of the present invention, according to one embodiment of the present invention.

The navigation and FDE module 140 is adapted to generate a conventional navigation solution, (e.g., a least squares solution), and to generate and monitor a Horizontal Protection Level (HPL) and an estimate of the horizontal estimated position error (Horizontal Uncertainty Level, HUL). The navigation and FDE module 140 is further adapted to generate a RAIM (or Integrity) Unavailable warning if the HPL exceeds the Horizontal Alarm Limit (HAL), as is known in the art. In accordance with the present invention, the navigation and FDE module 140 is also adapted to perform fault detection and exclusion and provide a Horizontal Position Alarm warning if excluding satellites cannot remove the fault while maintaining RAIM (or Integrity) Availability or the faulty satellite cannot be identified within a preset amount of time after the HUL has exceeded the second threshold. The navigation solutions and FDE information generated by module 140 is provided via output 145 to other systems within the aircraft 110 for use in navigating or surveillance of the aircraft 110. The GPS Receiver 135 and navigation and FDE module 140 can be implemented in one or more microprocessors programmed to carry out the inventive methods, as well as other known GPS receiver functions. FIGS. 5A and 5B illustrate methods and functions implemented by the navigation system 115 in preferred embodiments of the present invention.

Figure 3:
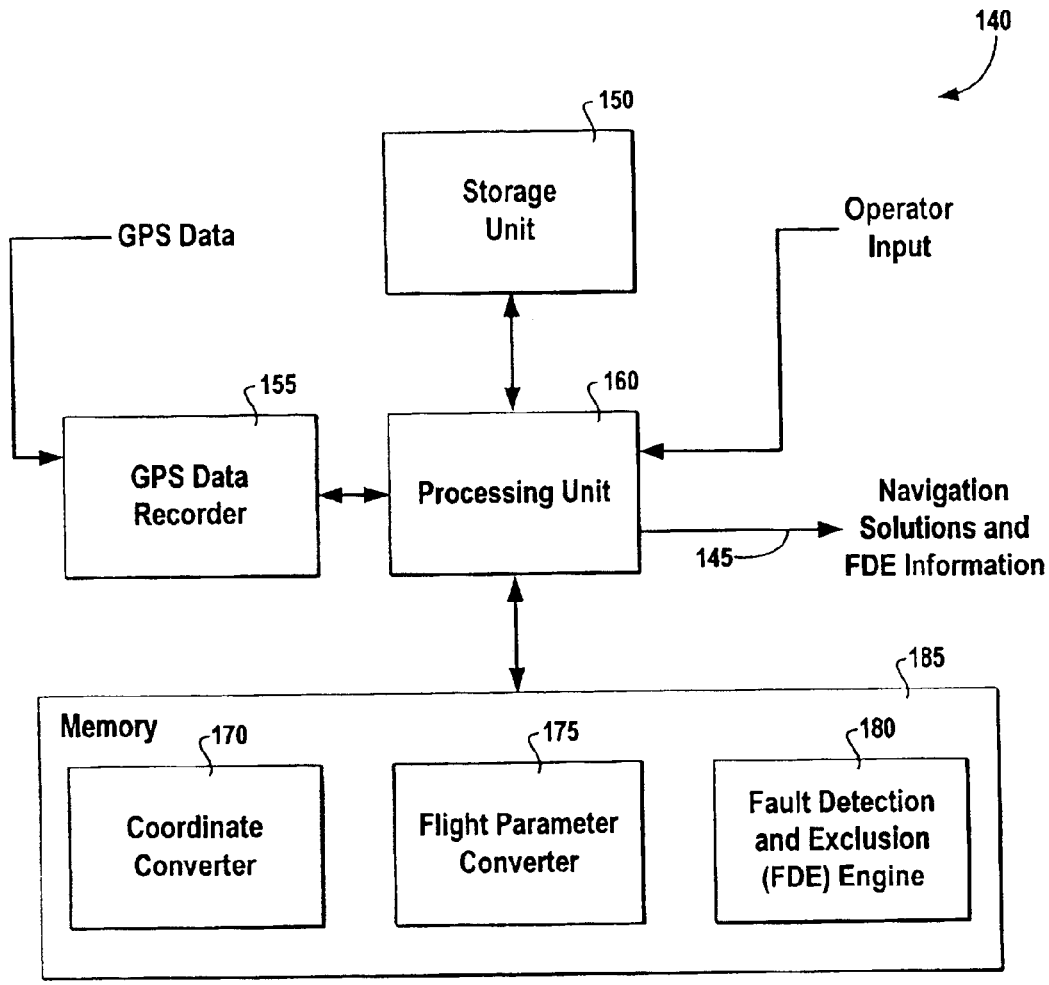
FIG. 3 is a block diagram illustrating a navigation and FDE module according to one embodiment of the present invention.

FIG. 3 shows details of the navigation and FDE module 140 according to one embodiment of the present invention. It will be appreciated that one or more components known to those of skill in the art may not be illustrated in the navigation and FDE module 140 of FIG. 2. The components may have been omitted from the figure so as to focus on the components used in the present invention. Similarly, one or more components illustrated as being located within the navigation and FDE module 140 may be located outside of the navigation and FDE module 140, eliminated or combined with other components as is well known in the art. For instance, one or more elements illustrated in FIG. 3 may be contained within the GPS receiver 135 in the embodiment shown in FIG. 2.

As is illustrated in FIG. 3, the navigation and FDE module 140 generally includes a GPS data recorder 155, processing unit 160, storage unit 150, and memory 185. The processing unit 160 controls the functions of the navigation and FDE module 140 and represents any processor that is operable to execute programs to process information. To execute functions of the navigation and FDE module 140 the processing unit 160 calls on the memory 185, which stores program code and data for use by the processing unit 160. The memory 185 may be implemented as a random access memory (RAM, either dynamic or static), read only memory (ROM), nonvolatile flash memory, or the like. The memory 185 includes a coordinate converter 170, flight parameter converter 175, and fault detection and exclusion (FDE) engine 180. The coordinate converter 170, flight parameter converter 175, and FDE engine 180 can be stored as executable instructions, i.e., a computer-readable program in a processor readable medium that causes the navigation system 115 to function in a particular fashion as discussed in detail below. Examples of the processor readable medium include an electronic circuit, a semiconductor memory device, a read-only memory (ROM), a flash memory, an erasable ROM (EROM), a floppy diskette, a compact disk (CD) ROM, an optical disk, a hard disk, a transmission medium, a fiber optic medium, a radio frequency (RF) link, etc.

The GPS data recorder 155 comprises one or more databases or memory elements operable to record GPS data as it is received from the GPS receiver 135 (or receivers) installed in the aircraft 110. The GPS data typically includes raw GPS data such as range (carrier and code) and delta-range measurements, satellite position and clock information. The GPS data is then read from the GPS data recorder 155 by the coordinate converter 170, which is operable to convert the GPS data to xyz data using a predetermined earth referenced xyz-coordinate system. The xyz data are determined based on the three-dimensional Cartesian coordinate system. Next, the flight parameter converter 175 converts the xyz data to the flight parameters, which are transmitted from the navigation and FDE module 140 as part of the navigation solutions and FDE information 145. The flight parameters include the current position, velocity, time, and integrity status at the given position and time of the aircraft 110. The conversion of GPS data to xyz position data, and the conversion of the xyz position data to flight parameters are well known to those of ordinary skill in the art.

The FDE engine 180 of the present invention monitors and identifies when a fault exists in a signal associated with one or more of the GPS Satellites. The operations of the FDE engine 180 are discussed in detail below with respect to FIGS. 4 and 5. Briefly, the FDE engine 180 monitors satellite measurements to determine integrity availability, detect the presence of a faulty satellite(s), and then attempts to isolate and exclude the faulty satellite(s) from the current GPS navigational solution. The FDE engine 180 uses a first threshold to detect the potential presence of an error, and a different, second threshold to trigger an isolate-and-exclude algorithm. The first threshold is sometimes referred to herein as the fault detection threshold, and the second threshold is sometimes referred to herein as the fault isolation threshold.

Figure 4:
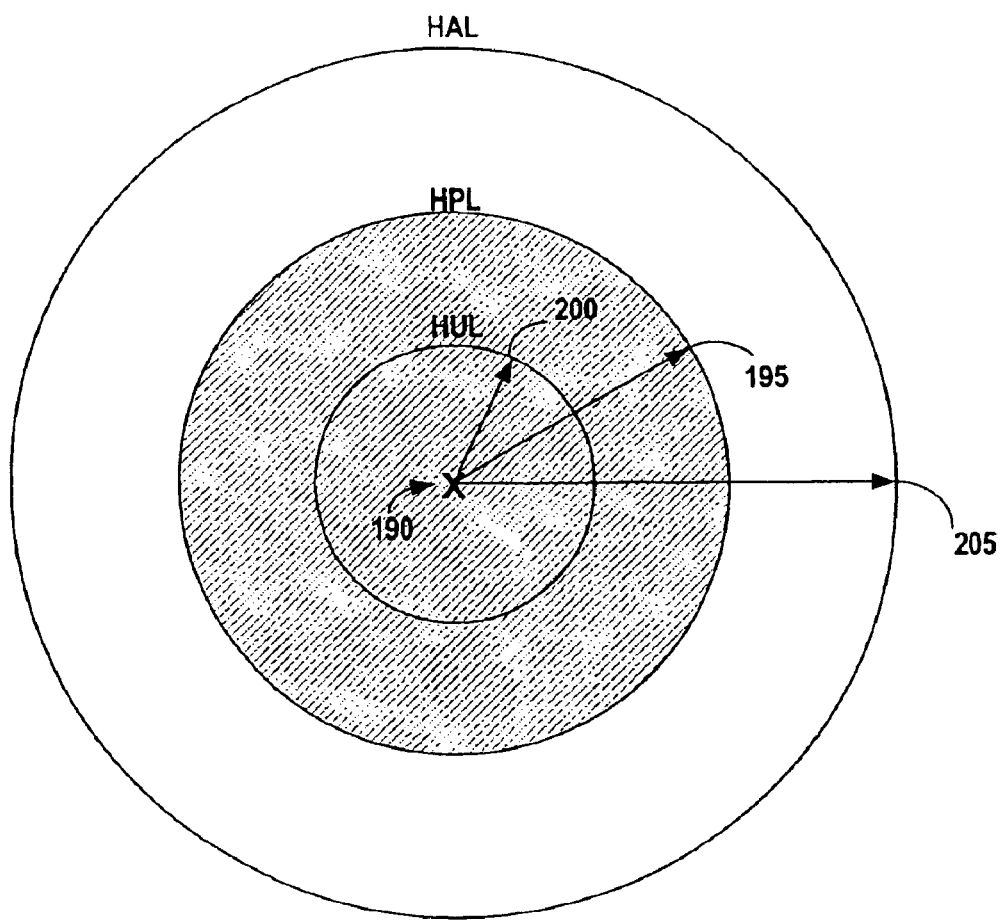
FIG. 4 illustrates a horizontal protection level (HPL), the horizontal estimated position error uncertainty (HUL), and a horizontal alarm limit (HAL), according to an illustrative example of the present invention.

As illustrated in FIG. 4, the FDE engine 180 allows an operator to input a HAL value. The HAL value defines an outer limit beyond which an alarm must be generated to indicate that the estimated position error is beyond an acceptable level for the specified operation. The HAL value is typically based upon aircraft navigation requirements, such as flight mode, as are well known in the art. For instance, flight modes include enroute, terminal, and approach modes of an aircraft. For other types of vehicles, a HAL value may be based upon an operational mode of the particular vehicle. The HAL value may be input via the operator input and stored within the storage unit 150 or in a memory 185 component, such as the FDE engine 180. For instance, an operator may specify an operational mode on which the HAL value is based. Alternatively, multiple HAL values may be hard-coded into the storage unit 150 or one or more memory 185 elements such as the FDE engine 180, such that they are not modifiable by an operator of the navigation system 115 via an operator input mechanism used to operate the navigation system 115.

Also illustrated in FIG. 3 is a storage unit 150 that includes any mass storage device that can store information in a non-volatile manner. The storage unit 150 may interface to a number of storage media such as CDROM, floppy diskettes, and hard disk, etc. These storage media may also be the processor readable media storing the program code segments for the coordinate converter 170, flight parameter converter 175, and FDE engine 180.

With the exception of the FDE engine 180, which is discussed in detail herein, further details of the components of FIG. 3 are not described herein because aircraft navigation using GPS signals and systems implementing the same are well known to those of skill in the art. However, it should be appreciated that other embodiments of navigation and FDE module 140 may exist using the FDE engine 180 described herein. Furthermore, as noted above, one or more additional elements not illustrated in FIG. 3 may exist within the navigation and FDE module 140. As an illustrative example, the navigation and FDE module 140 may include a smoothing filter that receives the xyz data from the coordinate converter 170 and smoothes the xyz position data to produce smoothed xyz position data provided to the flight parameter converter 175.

FIG. 4 illustrates an estimated position X, a horizontal protection level (HPL), the horizontal estimated position error uncertainty (HUL), and the horizontal alarm limit (HAL), according to an illustrative example of the present invention. It will be appreciated by those of skill in the art that with a GPS device, information signals transmitted from a plurality of satellites to a GPS receiver are analyzed using known techniques in order to determine the geodetic coordinates of the receiver, wherein the geodetic coordinates are typically provided in latitude and longitude. The geodetic coordinates (latitude and longitude), however, may vary in accuracy due to, for example, uncompensated, signal propagation anomalies or a mismatch between assumed and actual satellite ephemeris parameter values. Often associated with this variance in GPS accuracy is an integrity determination, which produces a warning if it is determined that the unexplained error associated with a GPS satellite is too large to be relied upon for navigational purposes.

Accordingly, in an effort to ensure GPS integrity, the HPL is determined by the navigation and FDE module 140 and compared to an allowable radial error for the flight mode, HAL in FIG. 4. If the HPL is found to exceed the HAL at a particular time in flight, a warning is issued that integrity is not available and the geodetic coordinate solution should not be relied upon for accuracy, (i.e., the RAIM function is not available).

According to the present invention, the HPL is determined by the navigation and FDE module 140 and more particularly, the FDE engine 180, based on the number of and geometry of satellites at a given point in time, the assumed measurement error statistics, and the required probability that a failure will not go undetected. The HPL is an integrity value that is a guarantee of sorts that, should there be a ranging measurement fault, it will be detected before the position error will exceed the HPL radius with the given missed alert and false alert probability requirements. The estimated (computed) location of the aircraft 110 is illustrated at the center point 190, which represents the GPS computation of the aircraft's position. The HPL computed by the navigation and FDE module 140 is illustrated in FIG. 4 as the radius HPL of a circle 195 in the horizontal plane where, should a satellite fault occur, the FDE algorithm would detect that fault with the given statistical confidence (usually set relatively high), as is well known in the art. This is illustrated as the shaded area within circle 195.

The HUL is a measure of actual position error. It is computed with information similar to that used for the HPL computation, but with the addition of measurement residuals information. HUL is an accuracy term, whereas HPL is an integrity term. The measurement residuals are the differences between what is expected for a ranging measurements and what was actually observed. HUL is considered to be a better estimate of the actual position error uncertainty. The user has a high degree of confidence (at least 99.9 percent) that his actual position error is fully within the circle of radius HUL in FIG. 4 from the estimated position, as is well known in the art. This is illustrated as the area within the circle 200.

Also illustrated in FIG. 4 is the circle 205 defined by the radius HAL. Although FIG. 4 shows a single value for HAL, it should be appreciated that multiple different values for HAL may be set based upon the aircraft's navigation and operational requirements. The present invention compares the aircraft's current HPL against the current HAL value, which may vary depending upon the required navigation requirements, such as the flight mode, during any moment of the aircraft's flight. For instance, where an aircraft is close to an airport and at low altitudes, the HAL may have tighter constraints due to increased air traffic density. In such a scenario, the HAL value against which the HPL is compared may be fixed at a smaller radial error, such as 1.0 nm. On the other hand, if the aircraft is in, for instance, high altitude flight over the ocean in a Trans-Atlantic crossing, the HAL value may have a higher value, such as 4.0 nm. For approaches to landing, however, the HAL value may range from 0.3 nm to 40 meters.

In the illustrative example of FIG. 4, integrity would be defined to be available because the HPL is less than the HAL. In other words, the RAIM function is available because the area of integrity defined by HPL is less than the alarm boundary defined by HAL. Further, because HUL is also less than HAL, if a satellite was thought to have a failure, the alarm would not yet be sounded because the HUL is also less than HAL. In the present invention, if a fault is detected, and HUL is equal to or more than a selected percentage of HAL, the system will attempt to detect and isolate the faulty signals. If, however, HUL exceeds HAL for more than a given time, an alarm will be sounded indicating that the errors have exceeded the threshold accuracy. During the time that HUL is greater than a percentage of HAL, but does not equal or exceed HAL, the present invention employs detect and isolate functions in attempt to determine a faulty ranging signal and exclude the faulty signal from the navigation solution.

The functions of the navigation and FDE module 140 and FDE engine 180 according to one embodiment of the present invention are described with reference to the flowchart illustrations of FIGS. 5A and 5B. It should be appreciated that the blocks of the flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions. Computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

FIG. 5A is a flow chart illustrating a first portion of the fault detection and exclusion function implemented by the navigation system of the present invention, according to one embodiment of the present invention. As shown at block 205, a fault detection threshold, (i.e., first threshold), is initially established. In the present embodiment, the threshold is preset or programmed in the FDE engine 180 as determined from the offline simulations. One fault detection threshold is established for each degree of freedom of the system, i.e., the number of satellites minus four (4). A fault detection threshold may be established by determining a value of a test value or statistic above which the measurements provided by a satellite will be deemed faulty. A test value or statistic may be a residual error, which is the value of a root-sum-squared of the difference between the measured range and the computed range of the position of each satellite. Thus, a small residual error indicates that the measured range is close to the computed range, which indicates that the measurements provided by the satellite are accurate. As such, the higher the first threshold, the more faulty measurements may go undetected, while the lower the threshold, the more correct measurements may be incorrectly flagged as faulty. Thus, the first threshold may be chosen by determining a value of a test value or statistic, such by multiple trials and simulations, that will provide the fewest missed detections and the fewest false alarms. Actual values used for the thresholds are a function of the missed alert and false alert probability rates and will vary depending on the prescribed rates, as is well known to those with skill in the art.

In some embodiments, the fault detection threshold, (i.e., first threshold), is set relatively low, while remaining compliant with the prescribed missed alert and false alert probability rates. This enables the present invention to detect faulty satellite signals relatively quickly, which, in turn, allows the system to provide an early warning to other systems that one or more satellites may not be functioning properly.

As illustrated in block 210, a fault isolation threshold, (i.e., second threshold) is also established. As with the fault detection threshold, (i.e., first threshold), the second threshold may be preset or programmed in the FDE engine 180 or input by an operator of the navigation system 115 via an operator input. In one embodiment, the second threshold is determined from the navigation requirements of the flight plan that is entered into the navigation system. Thus, the second threshold value preferably varies depending upon the aircraft's current navigation requirements. In a preferred embodiment of the invention, the second threshold, (i.e., fault isolation threshold), value is a relatively high percentage, such as 70% or greater, of the HAL that is established based upon the aircraft's navigation requirement. As is explained in greater detail below, a variable second threshold increases the likelihood that a system according to the present invention will correctly identify a faulty range measurement while minimizing the likelihood of excluding a proper measurement.

As shown in block 215, the system initial determines whether the fault detection function (RAIM) is available. This is determined by comparing the HPL value to the HAL value. As illustrated and discussed with regard to FIG. 4, if HPL is less than HAL, then the fault detection function is available. If HPL equals or exceeds HAL, then the fault detection function is not available. In this case, the system returns to the beginning and initiates a new comparison of HPL to HAL at the next navigation solution computation.

As shown at block 220, when and if the fault detection function becomes available, (i.e., HPL<HAL), the navigation system 115 determines a test value or statistic that is based on satellites measurements, and is well known in the art. Examples of the test value or statistic include a residual error, which is a function of the root-sum-squared of the difference between the measured range and the computed range of the position of each satellite, as known to those skilled in the art. Thus, a small residual error indicates that the measured range is close to the computed range, which indicates that the measurements provided by the satellite are accurate. On regular intervals, the system 115 compares the test value or statistic against the first threshold, (i.e., fault detection threshold), (block 230). Because there is one fault detection threshold for each degree of freedom of the system, as explained above, the appropriate first threshold to compare the computed test value or statistic against is determined, as known to those skilled in the art. If the test value or statistic does not exceed the first threshold, the system returns to block 215 and repeats the comparison of HPL to HAL and blocks 220–230. Although it is preferred that the loop operate continuously, according to one aspect of the invention there may be a delay period (block 235) after each comparison before blocks 215–230 are reran. The delay period may be set to any desired interval, based upon the requirements of the specific system.

If the test statistic exceeds the first threshold, (i.e., fault detection threshold), (block 230), the navigation system 115 transmits a signal to one or more external systems, such as any navigation or surveillance device that relies upon the information provided by the GPS satellites, indicating that one or more signals associated with the GPS satellites may be faulty (block 240).

Referring now to FIG. 5B, after the system 115 transmits a signal indicating that one or more GPS satellite signals may be faulty (block 240), the system monitors the aircraft's HUL value (block 245), which is effectively a statistical measure of the position error. The HUL value is computed using similar information used for the HPL computation, but it also includes measurement residuals information as known to those skilled in the art. The HUL is compared to the second threshold, (i.e., fault isolation threshold), (block 250). If the current HUL fails to meet or exceed the second threshold (block 255), the system 115 returns to block 215 and repeats blocks 215–255, optionally, after a delay period (block 260). In one embodiment of the system of the present invention, the monitoring continues by determining a test value or statistic based upon the satellite measurements (block 220) after the delay period (block 260), and continues the process of FIGS. 5A and 5B. Thus, any delay period may be chosen based upon the requirements of the specific system.

If the aircraft's computed HUL value meets or exceeds the second threshold, the system 115 will then attempt to isolate (i.e., identify) the faulty satellite using standard isolation techniques, as are well known in the art (block 265). Finally, once the faulty satellite is isolated, the system 115 will exclude the faulty satellite from the current GPS navigation solution (block 270).

Although not illustrated, the system of the present invention also compares the computed HUL value to HAL. If HUL equals or exceeds HAL, the system may either immediately generate an alarm or it may start a timer. If successive computed HUL values (or a certain percentage of HUL values) exceed HAL for more than a selected time, an alarm may be generated.

In some embodiments, the system also provides a timer that marks the time that HUL exceeds the second threshold. The timer represents the time elapsed since the system initiated the fault detection and isolation function. If the time exceeds a set value, the system determines that it is essentially not able to detect and isolate the faulty ranging signal(s) and indicates this by an alarm or message.

It will be appreciated by those of ordinary skill in the art that the process illustrated in FIGS. 5A and 5B has several advantages over prior art systems. First, because the fault detection threshold, (i.e., first threshold), value is set relatively low, the system detects the presence of faulty satellite signals at an early stage. This allows the system to provide an early warning to other systems that one or more satellites may not be functioning properly. Second, configuring the system to wait until the computed HUL value has reached a relatively high second threshold, i.e., a fault isolation threshold, before attempting to detect and isolate the faulty satellite(s) increases the likelihood of quickly and successfully identifying the faulty satellite(s) and minimizes the likelihood of excluding a satellite prematurely or excluding the wrong satellite. Furthermore, the second threshold (i.e., fault isolation threshold), of the present invention preferably varies with variable alarm limits, and calculation of a variable isolation threshold is simplified and substantially less computationally intensive than calculating a variable residual error threshold based on alarm limits.

In particular, the second threshold (i.e., fault isolation threshold) is computed by multiplying the HAL by a percentage, while a variable residual error threshold must be computed offline by running thousands, and in some cases millions, of simulations. In addition, because the thresholds must be determined for each degree of freedom of the system, which is the number of satellites in the system minus four (4), computing multiple variable position error thresholds is significantly less time consuming than computing multiple variable residual error thresholds. Furthermore, the fault detection in the FDE systems and methods of the present invention is independent of the operational mode of the vehicle because fault detection is based upon satellite measurements, not operational requirements. Thus, a complete set of thresholds for each HAL (one for each operational mode) is not needed in the present invention and provides increased flexibility for changes in the system. For aircraft, for example, operational modes, i.e., flight modes, include enroute, terminal, and approach modes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A processing element for use in a navigation system that relies on at least two ranging signals, said processing element configured to:

receive at least one estimated position error associated with at least two ranging signals;

determine at least one test value associated with at least two of the ranging signals and the at least one estimated position error value;

compare the test value to a first threshold to determine if the test value is at least as great as the first threshold value thereby representing a potential faulty ranging signal;

compare the estimated position error value to the second threshold value to determine if the estimated position error value is at least as great as the second threshold value; and initiate a fault detection and isolation procedure to eliminate one or more faulty ranging signals from use in a navigation calculation, if the estimated position error value is at least as great as the second threshold value.

2. A processing element in accordance with claim 1 wherein in the receiving of the at least one estimated position error associated with the at least two ranging signals, said processing element is further configured to receive at least one ranging signal that is a GPS signal.

3. A processing element in accordance with claim 1 wherein in the determining of the at least one test value associated with the at least two of the ranging signals and the at least one estimated position error value, said processing element is further configured to determine said at least one test value that is the root sum square of the residuals from the at least two ranging signals.

4. A processing element in accordance with claim 1 wherein in the receiving of the least one estimated position error associated with the at least two ranging signals, said processing element is further configured to receive said at least one estimated position error that is indicative of horizontal estimated position error.

5. A processing element in accordance with claim 1 wherein the navigational system records a plurality of conditions, said processing element is further configured to:

determine a first threshold that is independent of conditions recorded by the navigational system; and determine a second threshold that is based on the conditions recorded by the navigational system.

6. A processing element in accordance with claim 1 wherein said processing element is further configured to:

compare the estimated position error value to a horizontal alarm limit; and generate an alarm if the comparison indicates that the estimated position error value is at least as great as the horizontal alarm limit.

7. A processing element in accordance with claim 6 wherein in the comparing of the estimated position error to the horizontal alarm limit, said processing element is further configured to:

continuously compare the estimated position error value to the horizontal alarm limit; and generate an alarm if the comparison indicates that the estimated position error value remains at least as great as the horizontal alarm limit for a pre-determined amount of elapsed time.

8. A processing element for use in a navigation system, said processing element configured to:

receive at least two ranging signals from the navigational system;

select a first and a second threshold value;

receive a test value associated with the at least two ranging signals;

determine an estimated position error value; and determine if any of the at least two ranging signals are faulty; and prior to the at least two ranging signals being used in a navigational calculation, isolate the at least one faulty ranging signal if the test value is at least as great as the first threshold and the estimated position error is at least as great as the second threshold.

9. A processing element in accordance with claim 8 wherein said processing element is further configured to indicate to at least one system external to the navigation system that there is at least one potentially faulty ranging signal when the test value is at least as great as the first threshold.

10. A processing element in accordance with claim 8 wherein in the receiving of the at least two ranging signals from the navigational system, said processing element is further configured to receive at least one GPS signal.

11. A processing element in accordance with claim 8 wherein in receiving of the test value associated with the at least two ranging signals, said processing element is further configured to receive said test value that is the root sum square of the residuals from the at least two ranging signals.

12. A processing element in accordance with claim 8 wherein in the determining of the estimated position error value, said processing element is further configured to determine the estimated position error value as a percentage of a horizontal estimated position error.

13. A processing element in accordance with claim 8 wherein in selecting the first and second threshold value, said processing element is further configured to:

select the first threshold value independently of the conditions recorded by the navigation system; and select the second threshold value based on the conditions recorded by the navigation system.

14. A navigation system comprising a fault detection system, said navigation system is configured to receive a plurality of ranging signals, said fault detection system is configured to:

determine a residual error and a horizontal estimated position error associated with at least two of said plurality of ranging signals;

compare the residual error to a fault detection threshold to determine if at least one ranging signal is potentially faulty;

compare the horizontal estimated position error to a fault isolation threshold; and isolate the at least one faulty ranging signal from said navigation system when the horizontal estimated positional error is at least as great as the fault isolation threshold.

15. A navigation system in accordance with claim 14 further comprising at least one indicator for transmitting signals to at least one system external to said navigation system, wherein said transmitted signal is indicative of a potentially faulty ranging signal.

16. A navigation system in accordance with claim 14 wherein in the comparing of the residual error to the fault detection threshold to determine if the at least one ranging signal is potentially faulty said fault detection system is further configured to compare the residual error to the fault detection threshold that is a percentage of a horizontal alarm limit of said navigation system.

* * * * *